INVENTORS
RAYMOND L. DILLS
& CHRISTIAN A. EFF
BY Richard L. Caslin
THEIR ATTORNEY United States Patent Office
3,514,577
Patented May 26, 1970

1

3,514,577
COMBINED EXPANSIBLE BROILER OVEN AND
KITCHEN VENTILATING HOOD
Raymond L. Dills and Christian A. Eff, Louisville, Ky.,
assignors to General Electric Company, a corporation
of New York
Filed Dec. 18, 1968, Ser. No. 784,752
Int. Cl. F24c 15/20, 15/32
U.S. Cl. 219—400                                15 Claims

ABSTRACT OF THE DISCLOSURE

A side-by-side broiler oven and ventilating hood is shown mounted in a cantilever fashion as an integral part of a high-rise backsplash of an electric range. The oven is expansible in a downward direction by virtue of the presence of a removable drawer-like inner liner that is adapted to be telescoped into the oven liner and forms an adjustable bottom wall thereof. The oven has an exhaust vent that is open to the ventilating hood such that the hood is capable of drawing air both from the area above the cooktop of the range as well as from the broiler oven. The forced air movement caused by the hood also serves to provide the oven with a travelling blanket of cooling air around the oven liner.

CROSS-REFERENCE TO RELATED PATENT

The closest prior art known to the present inventors appear to be the Turner et al. Pat. No. 3,233,606 which shows a cooking appliance comprising a cooktop with a side-mounted oven and an overhead ventilating hood which is capable of drawing air both from the area above the cooktop as well as from the oven and exhausting it to the outside of the kitchen. The present invention is a later modification of the invention disclosed and claimed in the copending patent application Ser. No. 784,753, filed Dec. 18, 1968 and entitled "Combination Broiler Oven and Kitchen Ventilating Hood" which is being filed concurrently herewith by Raymond L. Dills, and which is assigned to the assignee of the present invention.

BACKGROUND OF THE INVENTION

Many housewives prefer the convenience of two ovens in the kitchen; one a large master oven and the other a smaller companion oven. Where there are two ovens present, the smaller oven could be a special broiler oven. However, in many modern homes today there is not room for a free-standing 40″ range with double side-by-side ovens without encroaching upon necessary counter and storage cabinet space. Moreover, the kitchen ventilating hood market is rapidly increasing. One big advantage of such a hood is that it is capable of removing the smoke, odors and vapors generated during an open door broiling operation. It is felt that a closer coupling between the broiler oven and the ventilating hood would completely solve the smoke, odor and grease problems, as well as provide the kitchen with a convenient broiler oven that is both compact in size as well as easily expansible to accommodate the larger portions of food which are cooked by broiling. Such a small but expansible broiler oven is ideal since a small cavity oven will not satisfy the actual needs and a large permanent broiler attached to the hood is undesirable for both appearance, space and cost reasons.

The principal object of the present invention is to provide a compact but expandable broiler oven in combination with a kitchen ventilating hood where the hood is capable of drawing air from both the oven as well as from the area beneath the hood and disposing of it.

A further object of the present invention is to provide

2 a broiler oven that is mounted in a raised cantilever fashion with a vertically adjustable bottom wall for varying the height of the cooking cavity.

A further object of the present invention is to provide a broiler oven of the class described with a removable drawer-like inner liner which serves as an adjustable bottom wall of the oven cavity.

A further object of the present invention is to provide a combined broiler oven and ventilating hood of the class described with a grease filtering means across the oven exhaust vent where said means is also provided with heat reflecting surfaces which shield the filtering means from the radiant energy of the heating means as well as direct such radiant energy downwardly toward the food to be cooked.

A still further object of the present invention is to provide a combined broiler oven and ventilating hood of the class described where the hood fan draws cooling air around the oven liner and cools the walls thereof and prevents food soil and grease spatter from burning onto the walls so as to facilitate the ease of cleaning the oven walls, as well as keeps the outer walls of the oven from becoming overheated.

SUMMARY OF THE INVENTION

The present invention, in accordance with one form thereof, relates to a combined broiler oven and kitchen ventilating hood where the broiler oven is formed as an integral part of the hood and has a cooking cavity with an adjustable bottom wall that is capable of relocation at various elevations so as to vary the height of the cooking cavity. This bottom wall is in the nature of a removable drawer-like inner liner that is capable of telescoping within the oven liner. The oven has an exhaust vent that is open to the ventilating hood such that the hood may draw air both from the broiler oven as well as from the area beneath the hood.

BRIEF DESCRIPTION OF THE DRAWINGS

Our invention will be better understood from the following description taken in conjunction with the accompanying drawings and its scope will be pointed out in the appended claims.

DESCRIPTION OF THE PREFERRED EMBODIMENTS

Figure 1:
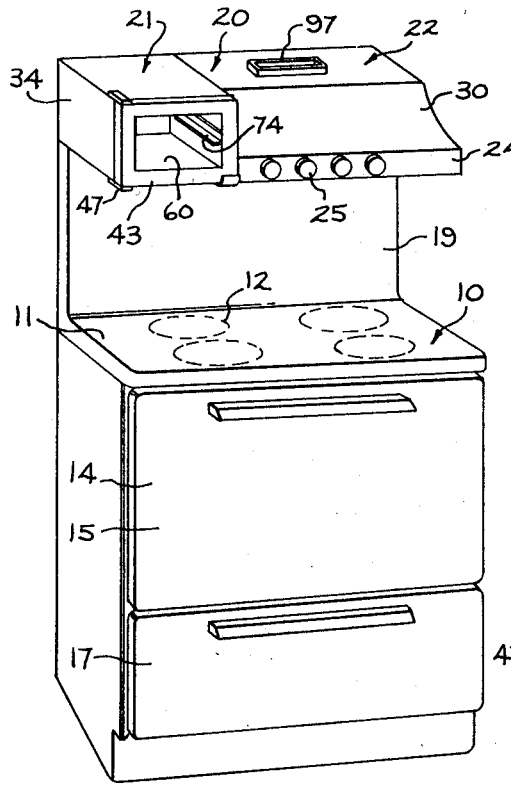
FIG. 1 is a front, perspective view of a free-standing domestic range equipped with a high-rise backsplash which incorporates a combined broiler oven and kitchen ventilating hood suspended from the top portion thereof.

Turning now to a consideration of the drawings, and in particular to FIG. 1, there is shown for illustrative purposes a free-standing electric range 10 having a top cooking surface 11 with a plurality of surface heating elements 12 in the form of coils of metal sheathed electrical resistance heating elements, a master oven 14 located beneath the cooktop 11 and provided with a front-opening access door 15. A utensil drawer 17 is provided beneath the master oven 14 for the storage of pots and pans. The back edge of the cooktop 11 is provided with a strong, high-rise backsplash 19 which is generally of flat sheet metal construction and has assembled along its top edge a combined unit 20 of a broiler oven 21 and a kitchen ventilating hood 22. This combined unit 20 is suspended over the cooktop 11 so that the bottom of the broiler oven 21 may be adjusted vertically by lowering a portion thereof so as to increase the height of the oven cooking cavity. Moreover, the broiler oven is vented through the hood 22 such that the hood is capable of drawing air from both the broiler oven 21 as well as from the area above the cooktop 11 before discharging the air from the hood to the outside of the kitchen.

Notice that the front edge of the ventilating hood 22 is shown with a control panel 24 for the entire range including controls 25 such as for the surface heating units 12, the oven heating elements (not shown) for the master oven 15 as well as for the small broiler over 21. There would also be a motor speed control switch for the fan in the hood.

Figure 3:
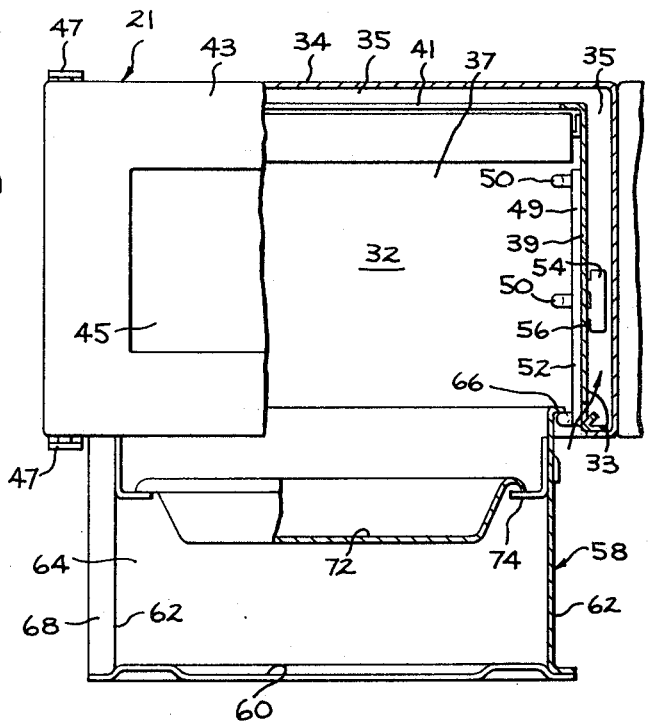
FIG. 3 is a fragmentary front elevational view of the broiler oven similar to that of FIG. 2 except that the inner liner has been adjusted to its lowest position thereby resulting in an expanded oven cavity.

A better understanding of the broiler oven 21 can be gained by a study of the enlarged front view of FIG. 3. The broiler oven 21 may either be a separate element attached to one end of the ventilating hood 22 or it could be an integral part of an outer sheet metal housing 30 of the hood. This is mainly dependent upon economics and the volume of production. If the number of units 20 is relatively high, it probably would be more economical to purchase the tools for making the oven and hood as a single unit. However, if the volume is relatively modest then it might be more economical to furnish a standard ventilating hood 22 and modify it to accommodate the broiler oven 21 at one side thereof.

The oven 21 has an oven cooking cavity 32 formed by a box-like oven liner 33 that fits into an outer oven housing 34 and leaves an air channel 35 between the oven liner 33 and the housing 34. This oven liner 33 includes a rear wall 37, opposite sidewalls 39, 39 and a top wall 41. Notice that both the botttom of the oven liner and the front of the oven liner are open. The front of the oven liner is adapted to be closed by an oven door 43 which is shown with a viewing window 45 therein. This door is a side-swinging hinged door having a vertical hinge axis extending down through a pair of hinge members 47, 47. Each side wall 39 of the oven liner 33 is provided with a series of vertically spaced ledges or runners 50. Such ledges are in the form of rungs of a ladder-like member 49 with two vertical sides 52 connecting three levels of ledges or rungs 50. This ladder-like member 49 is formed of metal rods which are welded together, and each member is held to the side wall 39 by at least two key members 54 on the back side thereof, each of which fits into a slot 56 in the side wall 39 and is locked therewith. The slot is oversized such that it is possible to maneuver the key 54 through the slot 56 so that the ladder member may be removed for ease of cleaning the walls of the oven liner. Of course, an alternative would be to have integral or embossed ledges 50 as in a standard oven liner.

Figure 2:
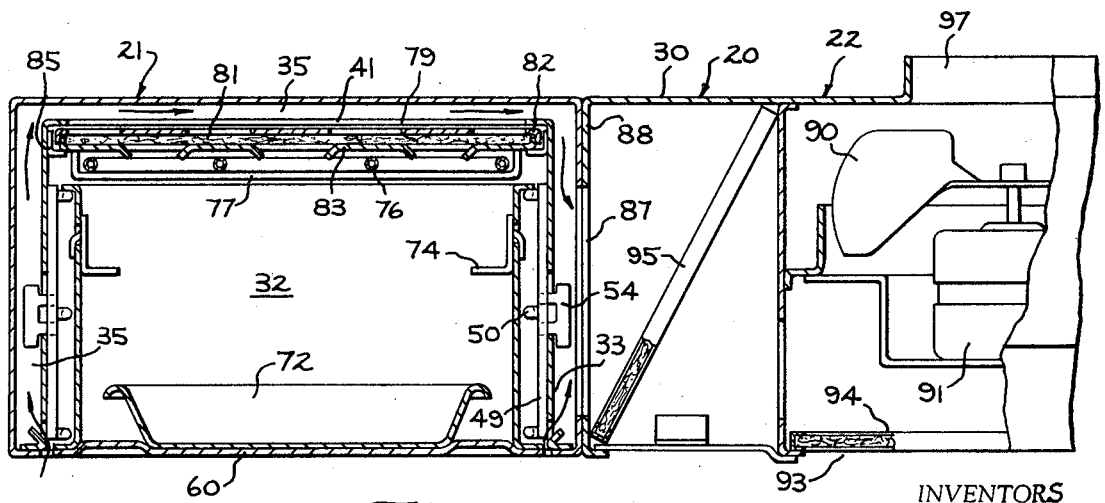
FIG. 2 is a fragmentary front cross-sectional elevational view through the broiler oven and a portion of the ventilating hood of FIG. 1 showing a removable drawer-like inner liner telescoped within the oven liner, as well as the communication and cooperation between the ventilating hood and the broiler oven.

The bottom of the oven liner is adapted to be closed by an inner liner 58 which is of a size to telescope within the oven liner 33 as is shown in FIG. 2. This inner liner 58 is a drawer-like member having a bottom wall 60, opposite sidewalls 62, 62 and a rear wall 64. Both the front and the top of the inner linear 58 are open. Each sidewall 62 of the inner liner is provided with an outward flange 66 adjacent its top edge, and it is adapted to seat upon one of the ledges 50 of the oven liner. Accordingly, the inner liner 58 has three possible vertical positions within the oven liner 33; namely supported in (1) the closed or top position of FIG. 2, (2) the fully open or bottom position of FIG. 3 and (3) in an intermediate position between the two extreme positions. In order to change the position of the inner liner it is necessary to first open the broiler oven door 43 and then the inner liner is capable of being removed by pulling it forward on the ledges 50 until it is out of the oven where it may be cleaned or for changing its elevations of the inner liner with respect to the oven liner. Notice that the front edge of the side wall 62 has a front flange 68 that is outwardly directed as a reinforcing member to strengthen the sheet metal construction of the inner liner. Moreover, it will be understood that the oven liner 33 has outwardly directed flanges on its front edge for closing the air channels 35 and presenting a neat appearance. A broiler pan 72 is adapted either to sit on the bottom wall 60 of the inner liner as is shown in FIG. 2, or it may be suspended from ledges or angle brackets 74 from the opposite side walls 62, 62 of the inner liner so as to be able to vary the relative distance between the broiler pan in which the food is to be cooked and a broil element 76 which is located adjacent the top wall 41 of the oven liner as is best seen in FIG. 2. The broil unit 76 in the form of a metal sheathed electrical resistance heating element of serpentine shape which is supported near the front of the oven by a hanger member 77 of wire form. The back portion of the broiler unit 76 is the terminal end and it extends through suitable openings in the back wall 37 of the oven liner where electrical connections (not shown) may be made to the unit terminals. This terminal end is preferably a hinged member which permits the broil unit to swing down when the hanger 77 is removed.

The top wall 41 of the oven liner is provided with a large hole or opening 79 which represents the oven exhaust vent. The broil unit 76 is spaced away from the oven exhaust vent 79 by a distance which will allow the installation of a grease filter 81, such as of woven, fine mesh aluminum strips, which is supported in a surrounding metal frame 82. Across the bottom face of the grease filter 81 are a plurality of reflectors or shield surfaces 83 which are generally of inverted, concave strip form which are centered above the turns of the broil unit 76 such that the radiant energy from the unit is deflected away from the grease filter 81 to prevent fires, and is directed in a downward direction toward the food to be cooked in the oven, as for example toward the broiler pan 72. Grease filter 81 is a removable element that is supported on rails 85 on the opposite sidewalls 39, 39 of the oven liner 33. By opening the oven door 43 to its fully open position, the grease filter may be grasped and slid forwardly until it is completely out of the oven where it may be carried to the kitchen sink and washed before it is returned to the oven. Actually the hanger member 77 is fastened to the underside of the grease filter frame 82.

Notice that relatively cool room air may enter the air channels 35 from beneath the oven and pass over and around the outside of the oven liner. The oven exhaust may pass between the reflective or shielding portions 83 of the grease filter 81 and through both the filter medium and the oven exhaust vent 79 until reaching the air channels where they are drawn by the draft of the hood fan through an opening 87 in a side partition 88 that separates the broiler oven 21 from the ventilating hood 22.

A schematic diagram of the inner workings of the ventilating hood 22 is shown at the right side of FIG. 2. There is a hood blower or fan member 90 supported within the hollow housing 30 of the hood and it is powered by a fan motor 91. The primary function of the hood is to draw air from the area above the cooktop 11. The hood has a large air inlet opening 93 in its bottom portion that is covered by a grease filter 94. Moreover, there is another grease filter 95 disposed between the discharge opening 87 in the broiler oven 21 and the hood fan 90. It is desirable to protect the fan and its motor from the accumulation of grease and food soil by using cleanable or renewable filter elements, as is well understood by those skilled in this art. A discharge vent 97 is formed in the top wall of the ventilating hood 22 so that the hood may be vented to the outside of the kitchen. Of course, it would also be possible to provide additional filtering means so that the hood may be a recirculating or ductless hood that is not vented to the outside of the kitchen.

Modifications of this invention will occur to those skilled in this art. Therefore, it is to be understood that this invention is not limited to the particular embodiments disclosed, but that it is intended to cover all modifications which are within the true spirit and scope of this invention as claimed.

What we claim as new and desire to secure by Letters Patent of the United States is:

1. A combination kitchen ventilating hood and broiler oven comprising a hood shell with a broiler oven mounted at one end thereof, the hood shell including air movement means for drawing air from both beneath the hood and from the broiler oven, and exhaust means for discharging air from the hood shell, air filtering means between the broiler oven and the air movement means and between the air intake beneath the hood and the air movement means, the broiler oven having a cooking cavity formed by a box-like oven liner enclosed by an outer shell, both the oven liner and the outer shell each having a top wall, opposite sidewalls, a rear wall, an open bottom wall and an open front wall, the outer shell supporting an oven door for closing the front of the oven liner, each opposite sidewall of the oven liner including at least an upper and a lower supporting ledge, a removable drawer-like inner liner adapted to fit within the oven liner and be supported from the said upper ledges, said inner liner having a bottom wall, opposite sidewalls, a back wall, an open front and an open top wall, each opposite sidewall of the inner liner having an upper supporting ledge, and a food-supporting device adapted to be supported from the last-named ledges, heating means located in the top portion of the oven liner for cooking foods placed within the oven cavity, the inner liner being removable from the oven liner when the oven door is open whereby the inner liner may be supported from said lower supporting ledges of the oven liner thereby enlarging the size of the oven cavity, and air passage means connecting the oven liner to the ventilating hood.

2. A combination kitchen ventilating hood and broiler oven as recited in claim 1 wherein each sidewall of the said inner liner has a top supporting flange for seating on opposite ledges of the oven liner, as well as a bottom cover flange for substantially closing the bottom of the oven liner when the inner liner is supported from the upper ledges of the oven liner.

3. A combined broiler oven and kitchen ventilating hood comprising a broiler oven having a cooking cavity formed by a box-like oven liner and a front-opening access door, the oven liner having opposite sidewalls, a rear wall, a top wall and an open front and bottom walls, an outer shell surrounding the top, the two sides and the rear of the oven liner, and means for closing the bottom of the oven liner comprising a drawer-like inner liner having a bottom wall, opposite sidewalls, a rear wall and an open front and top walls, each sidewall of the oven liner having an upper and a lower supporting ledge, each sidewall of the inner liner having an outer supporting flange for seating on the upper ledges of the oven liner, whereby the inner liner is completely telescoped within the oven liner, the inner liner being removable so that it may be reassembled on the lower ledges of the oven liner, a heating means located adjacent the top wall of the oven liner, an oven exhaust vent located adjacent the top of the oven liner emptying into the outer shell, the outer shell having an exhaust vent emptying into the ventilating hood, said ventilating hood comprising a hood shell including an air movement means for drawing air from beneath both the hood and from the exhaust vent of the outer shell of the broiler oven, and grease filtering means associated with the ventilating hood for removing grease particles from the air before the air passes through the air movement means, the hood shell also including an exhaust duct means for discharging air from the hood shell.

4. A combined broiler oven and kitchen ventilating hood as recited in claim 3 wherein the combined unit is adapted to hang in a cantilever fashion at generally eye-height where there are no obstructions beneath the broiler oven to interfere with the downward adjustment of the inner liner.

5. A domestic cooking appliance having a cooktop with an integral high-rise backsplash; wherein the invention comprises a combined broiler oven and a kitchen ventilating hood supported from the top of the backsplash in a cantilever fashion, the broiler oven having a cooking cavity formed by a box-like oven liner and a front-opening access door, an inner liner telescoped within the oven liner and forming the bottom wall thereof, said inner liner having a bottom wall, opposite sidewalls, a rear wall and an open front and top walls, means for supporting the inner liner in the oven liner at various elevations so as to be able to alter the height of the cooking cavity, a heating means located adjacent the top wall of the oven liner, an oven exhaust vent located adjacent the top of the oven and opening into the ventilating hood, said hood comprising a hollow housing with an air intake opening in its bottom portion for collecting food odors and vapors from the area above the cooktop, an air blower within the housing for drawing air from both the area above the cooktop and the broiler oven, the housing having a hood exhaust vent downstream of the air blower for carrying off the air flow from the hood.

6. A domestic cooking appliance as recited in claim 5 wherein the inner liner is provided with alternate vertically spaced food-supporting means for varying the relative distance of the food from the said heating means adjacent the top of the oven liner.

7. A domestic cooking appliance as recited in claim 5 wherein the said oven exhaust vent is located in the top wall above the said heating means, a grease filter positioned between the heating means and the oven exhaust vent, said grease filter including heat reflecting surfaces overlying the heating means to direct most of the radiant energy from the heating means in a downward direction toward the food to be cooked.

8. The subcombination of a broiler oven having a cooking cavity formed by a box-like oven liner and a front-opening access door, the oven liner having a rear wall, opposite sidewalls, a top wall, and an open front and bottom walls, an inner liner capable of being telescoped within the oven liner and forming the bottom wall thereof, said inner liner having a bottom wall, opposite side walls, a rear wall and an open front and top walls, vertically spaced means for supporting the inner liner in the oven liner at various elevations so as to alter the size of the cooking cavity, a heating means located adjacent the top wall of the oven liner, and an oven exhaust vent located adjacent the top of the oven for carrying off the oven gases.

9. The subcombination of a broiler oven as recited in claim 8 wherein the opposite side walls of the inner liner have vertically spaced means for supporting a broiler pan at various distances from the said top heating means.

10. The subcombination of a broiler oven as recited in claim 9 wherein the said oven exhaust vent is located in the top wall of the oven liner, and a grease filter is positioned between the heating means and the oven exhaust vent, said grease filter including heat reflecting surfaces overlying the heating means to deflect most of the radiant energy from the heating means in a downward direction.

11. The subcombination of a combined broiler oven and kitchen ventilating hood wherein the broiler oven has a hollow housing with a cooking cavity formed by an oven liner and a front-opening access door, said oven liner having a rear wall, opposite side walls, a top wall, an open bottom wall, an open front wall that is adapted to be closed by the front door, an inner liner capable of being telescoped within the oven liner and closing the open bottom wall thereof, said inner liner having a bottom wall, opposite sidewalls, a rear wall, and an open front and top walls, vertically spaced ledges formed on the opposite sidewalls of the oven liner, and means on the inner liner engageable with the side wall ledges for supporting the inner liner in a slidable drawer-like relationship at various elevations so as to be able to alter the height of the cooking cavity, and means for supporting a food-bearing device in the inner liner at various elevations, an electrical resistance heating element located adjacent the top wall of the oven liner, an oven exhaust vent in the top portion of the oven liner, the said ventilating hood having a hollow housing equipped with a blower means associated with the broiler oven for drawing air into the hood housing from both beneath the hood and from the oven exhaust vent, and a hood exhaust vent cooperating with the blower means for drawing off air from the hood.

12. The subcombination of a combined broiler oven and kitchen ventilating hood as recited in claim 11 wherein said means on the inner liner engageable with the side wall ledges comprises an outwardly directed flange on each inner liner sidewall, said oven housing being spaced outwardly of the oven liner to establish air channels therebetween, said air channels communicating with the ventilating hood whereby when the blower means is operating relatively cool room air passes through the said air channels and serves to thermally isolate and insulate the oven liner from the oven housing thereby preventing food soil and grease spatter from burning onto the oven liner walls as well as keeping the outer walls of the oven from becoming overheated.

13. The subcombination of a combined broiler oven and kitchen ventilating hood as recited in claim 12 wherein the said electrical resistance heating element is an elongated, insulated metal sheathed unit of looped configuration, a grease filter assembled over the heating element and beneath the oven exhaust vent and including heat reflecting surfaces overlying much of the extent of the heating element to shield the grease filter from the radiant energy of the heating element and deflect it in a downward direction toward the food to be cooked in the oven.

14. An electric range comprising a cooktop with a structural high-rise backsplash located along the back edge of the cooktop, a combined unit of a broiler oven and kitchen ventilating hood supported in a cantilever fashion from the top of the backsplash, said unit comprising a hollow divided housing with a broiler oven at one end and a ventilating hood at the other end for carrying off the exhaust gases from the broiler oven and for ventilating the area above the said cooktop, said oven having a cooking cavity formed by an oven liner and a front opening access door, said oven liner having a rear wall, opposite side walls, a top wall, an open bottom wall, and an open front wall that is adapted to be closed by the oven door, an inner liner capable of being telescoped within the oven liner and closing the bottom wall thereof, said inner liner having a bottom wall, opposite sidewalls, a rear wall, and an open front and top walls, vertically spaced ledges formed on the opposite sidewalls of the oven liner, the opposite side walls of the inner liner each having an outwardly directed flange for engagement with the said ledges for supporting the inner liner in a slidable drawer-like relationship at various elevations so as to be able to alter the height of the cooking cavity, and means for supporting a broiler pan in the inner liner at various elevations, a metal sheathed electrical resistance broiling element located adjacent the top wall of the oven liner, an oven exhaust vent in the top wall of the oven liner, the said ventilating hood including a motor driven fan for drawing air from the oven exhaust vent and through the hood to be discharged therefrom.

15. An electric range as recited in claim 14 wherein the kitchen ventilating hood includes a grease filtering means positioned upstream of the motor driven fan to protect the fan from food soil, a grease filtering element positioned between the said broiling element and the oven exhaust vent, said last-named filtering element including heat shielding surfaces overlying the broiling element and shielding the filtering element from the radiant energy of the broiling element as well as directing most of the radiant energy from the broiling element in a downward direction.

References Cited
UNITED STATES PATENTS 2,944,540    7/1960    Littell.  
3,051,157    8/1962    Rice _____ 126—19  
3,233,606    2/1966    Turner et al. _____ 126—299

CHARLES J. MYHRE, Primary Examiner

U.S. Cl. X.R.

126—21, 41, 299